Feb. 9, 1937.  R. C. HOFFMAN  2,069,952
WHEEL
Filed June 15, 1931  2 Sheets-Sheet 1

INVENTOR
Roscoe C. Hoffman.
BY
ATTORNEYS.

Feb. 9, 1937.   R. C. HOFFMAN   2,069,952
WHEEL
Filed June 15, 1931   2 Sheets-Sheet 2
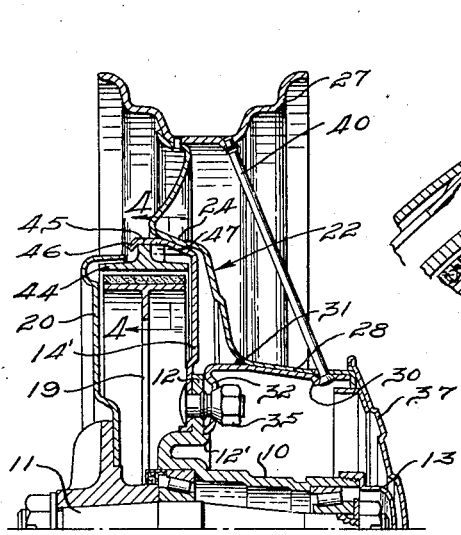
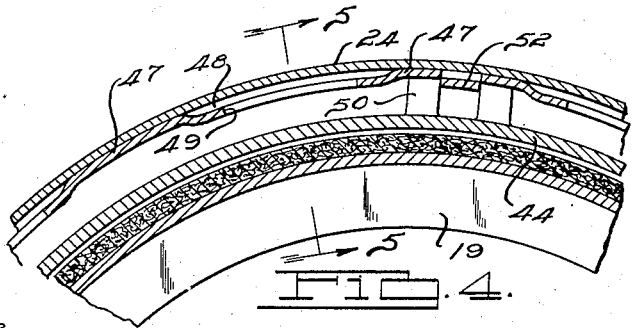
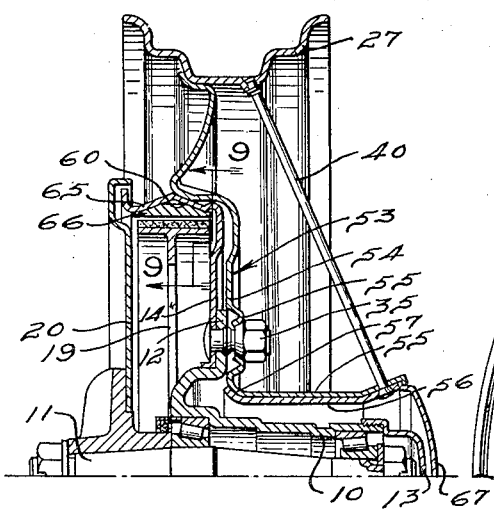
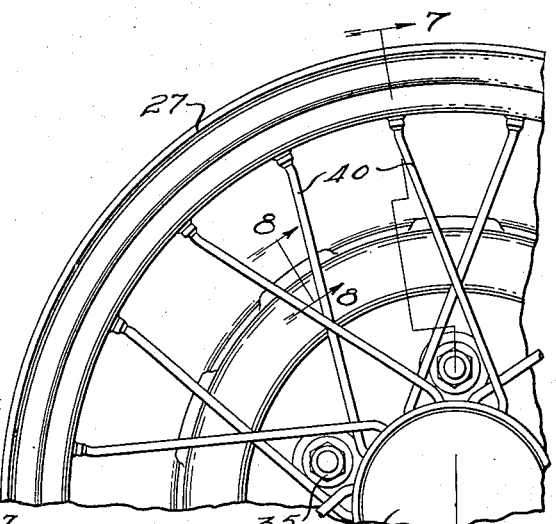
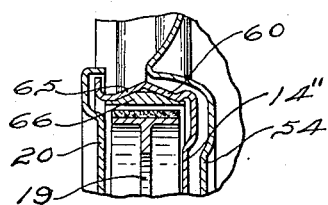
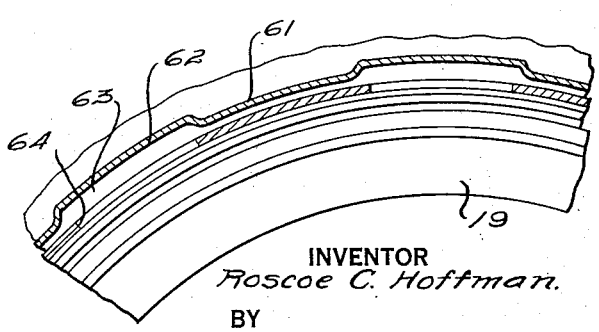
INVENTOR
Roscoe C. Hoffman.
BY
ATTORNEYS.

Patented Feb. 9, 1937

2,069,952

UNITED STATES PATENT OFFICE 2,069,952

WHEEL

Roscoe C. Hoffman, Detroit, Mich.

Application June 15, 1931, Serial No. 544,497

4 Claims. (Cl. 301—6)

The invention relates to wheels and it has particular relation to a wheel of the demountable type for use on motor vehicles.

The principal objects of the invention are to provide a wheel including a hub covering element in which the latter is associated in a novel manner with spokes and a disc utilized for supporting a tire rim; to provide a new type of demountable disc and wire spoke wheel having a hub covering element in which the parts are so constructed and arranged that a strong construction is provided with a minimum quantity of structural material; to provide a disc type of wheel having a brake drum member in which the disc and member mutually support each other in a novel and efficient manner; to provide a disc type of demountable wheel in which the disc is composed of relatively thin material and reinforced in a novel manner; to provide a demountable wheel which is wedged on the brake drum and is also positively centered on the wheel hub, and maintained in a plane perpendicular to the hub axis; and to provide a disc and wire spoke type of wheel, in which the disc is wedged on the brake drum in a stressed manner which insures wedging coaction between the members.

For an understanding of the invention, reference may be had to the accompanying drawings forming a part of the specification, in which:

Fig. 3 is a cross sectional view similar to that shown by Fig. 2, illustrating a modified form of the invention;

Fig. 4 is a cross sectional view, on a larger scale taken substantially along line 4—4 of Fig. 3;

Fig. 5 is a cross sectional view taken substantially along line 5—5 of Fig. 4;

Fig. 6 is a fragmentary elevational view of a wheel constructed according to another form of the invention;

Fig. 7 is a cross sectional view taken substantially along line 7—7 of Fig. 6;

Fig. 8 is a cross sectional view taken substantially along line 8—8 of Fig. 6;

Fig. 9 is a cross sectional view taken substantially along line 9—9 of Fig. 7.

Figure 1:
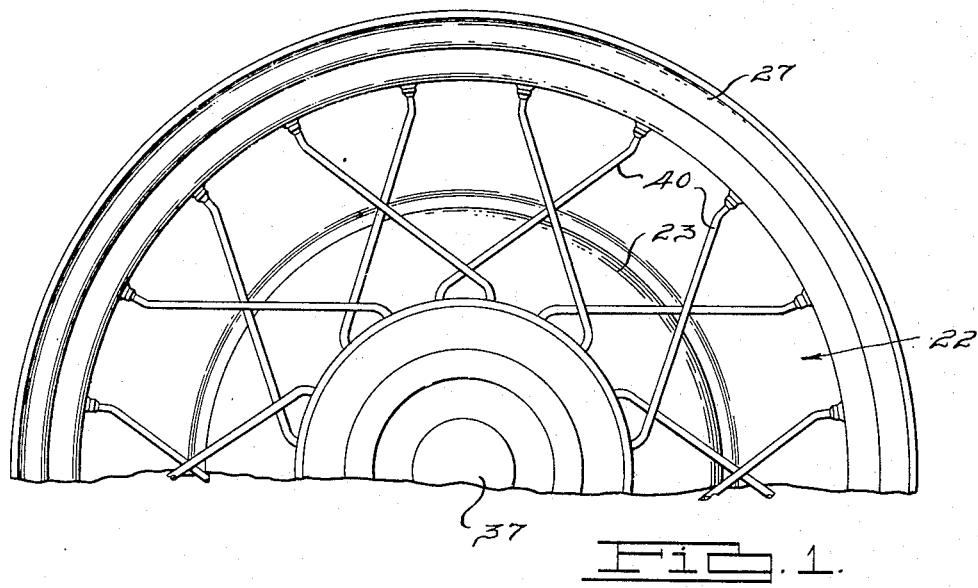
Figure 1 is a fragmentary elevational view of a wheel constructed according to one form of the invention.
Figure 2:
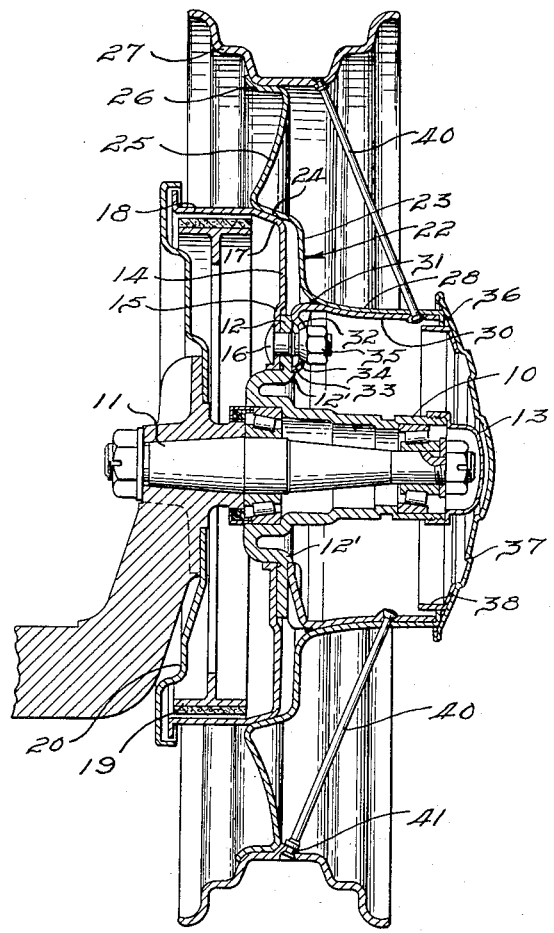
Fig. 2 is a vertical cross sectional view of the wheel fragmentarily shown by Fig. 1.

Referring to Figs. 1 and 2, illustrating the front wheel of a vehicle, a wheel hub 10 is provided which is mounted on a spindle 11 in a conventional and well known manner. Adjacent its inner end, the hub 10 is provided with a radial flange 12 while at its outer end, it is provided with a cap 13 primarily employed for the purpose of preventing the escape of lubricant from within the hub. A brake drum 14 has an inner radial portion or web 15 secured to the inner side of the flange 12 by means of bolts 16 ordinarily associated with the flange in a permanent manner. Radially inward of the bolt circle, the hub flange 12, at its outer side is provided with a plurality of disc seating and centering lugs 12' or in lieu of lugs, the flange may have an annular flange for seating and centering a disc. Adjacent its outer edge the brake drum member 14 is provided with an axially inclined portion 17 which terminates in an axially extending flange portion 18 providing a braking surface. The last mentioned portion overlies a friction element 19 of any conventional construction which is adapted to be expanded into engagement therewith. An end housing member 20, commonly known as a backing plate and rigidly secured to the spindle support, closes the open end of the brake drum.

The demountable wheel illustrated in these figures comprises a disc 22 having an intermediate portion 23 extending radially and in spaced relation to the web 15 of the brake drum, and an axially inclined portion 24 which has a wedging engagement with the axially inclined portion 17 of the brake drum. Outwardly of the inclined portion 24 of the disc, the latter has a slightly arcuate or convex portion 25 terminating in a felloe 26 which embraces one side of a tire rim 27, shown in the drawings as of the drop center type. The inner portion of the disc 22 extends in a generally axial direction toward the outer end of the hub 10, to provide a hub covering element 28, which snugly encloses an inner hub covering element 30 and preferably is welded thereto as indicated at 31. The disc 22 is composed of relatively thin metal, while the inner hub covering element 30 is composed of metal of heavier gauge and consequently, the latter constitutes a strong reinforcement for the hub covering element 28 of the disc. The inner portion of element 30 terminates in an inwardly directed, substantially radial flange 32 which abuts the outer side of the hub flange 12. At peripherally spaced points, the flange 32 has outwardly pressed portions 33 which are provided with conical openings 34. Nuts 35 having conical faces engaging the conical openings 34, are threaded on the outer ends of the bolts 16 and secure the flange 32 to the hub flange 12.

The outer end of the hub covering portion 28 of the disc preferably terminates in an inwardly directed flange 36 which overlaps the outer end of the inner hub covering element 30. A hub cap 37 covers the opening defined by the outer ends of the elements 28 and 30 and is provided with an axially flanged portion 38 which projects into the opening defined by the inwardly directed flange 36 on the hub covering element 28. Wire spokes 40 connected to the rim 27 at their outer end, as indicated at 41, extend through openings in the hub covering element 28 on the disc, and are rigidly connected to the hub covering element 30 adjacent to its outer end.

In a construction such as that described, the disc 22 may be composed of material of relatively light gauge because it is sufficiently reinforced by the inner, relatively heavy hub covering element 30 secured to the hub flange 12, by the spokes 40 connecting the rim and the inner hub covering element, and by the wedging support between the inclined portion 24 on the disc and the inclined portion 17 on the brake drum 14. Accordingly, the discs may be manufactured less expensively. The wedging engagement between the disc, and the brake drum member is particularly desirable because it provides a positive support for the wheel on the brake drum without interfering with the readily demountable characteristics of the wheel. In mounting the wheel on the hub the inclined portion 24 on the disc initially will be seated on the inclined portion 17 of the brake drum member, and then when the nuts 35 are tightened on the bolts 16 the inclined portions of the disc and brake drum member will be drawn into positive wedging relation. Also in mounting the disc, the lugs or flange 12' will cooperate with the inner edge of the flange 32 and center the wheel as well as assist in supporting it.

Initially, in mounting the wheel on the hub, the inclined portion 24 of the disc is disposed on the inclined portion 17 of the brake drum member 14, which leaves the flange 32 spaced from the hub. Hence, the drawing of the inclined portion into wedging relation is effected more or less resiliently because of the fact that tightening of the nuts 35 will flex the inner portion 23 of the disc about the wedging contact as a fulcrum. Provision of the reinforcing and rather heavy hub carrying element 30, and mounting the disc on the outer periphery of such element, provides a very firm support for the rim 27. When it is desired to remove the wheel, it is only necessary to remove the hub cap 37, and then remove the nuts 35.

It will be apparent from the previous description, and drawings related thereto, that the wheel is light because of the thinness of the metal used in the disc and also because a small number of spokes are required. Using a small number of spokes additionally facilitates cleaning the wheel because a brush, for example, may more easily be inserted between the spokes. Using a wheel of light weight also is extremely advantageous because the wheel does not add very much to the unsprung weight of the vehicle, and may be manufactured less expensively.

Wedging the disc on the inclined surfaces 17 of brake drum member 14 is advantageous because the load on the disc, or at least a portion of the load, is positively supported conjointly by the disc and brake drum member. The arrangement is sharply in contrast to one wherein a disc merely contacts with a brake drum member and does not have a wedging engagement because a mere contact without wedging engagement does not constitute a load supporting arrangement.

Referring to Fig. 3, the outer portion of the brake drum member indicated at 14 terminates in a flange 45 which has a deflected end portion 46 utilized for retaining a brake ring 44 within the periphery of the flange. As best shown by Fig. 4, the flange 45 is provided with peripherally spaced, outwardly pressed and axially inclined portions 47 which are adapted to support the inclined portion 24 of the disc at peripherally spaced points. Mounting the disc on the brake drum member in this manner provides spaces 48 between the inclined portion of the disc and the flange 45, which permit air to circulate between the disc and the flange. Intermediate the outwardly pressed portions 47 on the brake drum member, openings 49 are formed in the flange 45 which permit the air to circulate about the outer periphery of the brake ring 44 and in and about the brake member 19. At one or more points the brake ring 44 is provided with lugs 50 which project into a space formed by pressing the portion 47 outwardly from the periphery of the flange 45. A lip 52 struck from the flange 45 projects between the lugs 50 and serves as an additional connection between the brake ring 44 and the flange.

The wheel illustrated by Fig. 3 and above described is similar to that shown by Fig. 2 except for a primary distinction in the brake assembly. In Fig. 2, the brake member 14 is constructed of relatively heavy gauge metal because the brake drum portion must be sufficiently heavy to prevent undesirable distortion thereof when the brake member 19 is applied. In the construction shown by Fig. 3, the brake ring 44 is composed of cast iron or rolled steel of high carbon content, and the brake drum member or disc 14' is composed of sheet steel. In both constructions, the rim supporting discs are composed of sheet steel. It is apparent in Fig. 3 that the discs 14' and 22 mutually support and reinforce each other, and provide a rigid support for the brake ring 44, and that the discs so related, can be constructed of light gauge sheet steel, while at the same time the brake ring and rim are rigidly supported. This relation of parts not only reduces the expense of manufacture, since less metal is necessary, but decreases the unsprung weight of the vehicle because the wheel and brake are lighter.

In a wheel of the character shown by Fig. 3, air is permitted to circulate freely about the brake ring and brake member adapted to coact therewith and this prevents overheating of the brake and the tire on the rim. Also by providing a wedging engagement between the disc and the brake drum member 14' at peripherally spaced points, uniform contact between the inclined portions of the disc and the brake drum member is insured regardless of variations that may occur in the contacting surfaces of the inclined portions.

In the construction shown by Fig. 7, a disc 53 is utilized which has a radial portion 54 provided with conical openings at peripherally spaced points as indicated at 55, which in conjunction with the nuts 35 and bolts 16, secure the disc to the flange 12 of the hub. Inwardly of the portion secured to the flange 12, the disc is provided with a hub covering portion 55 which snugly receives a reinforcing element 56 retained in position by outwardly deflected and complementary end portions on such disc portion and element. Similarly to the construction previously illustrated, the spokes 40 project through the hub covering portion of the disc and are connected to the reinforcing element 56.

The brake drum member indicated at 14" in this construction similarly has an inclined peripheral portion 60 which is adapted to support peripherally spaced, inclined portions 61 formed on the disc as best shown by Fig. 9. Intermediate the portions 61 on the disc, the latter is outwardly pressed as indicated at 62 to provide spaces 63 between the brake drum member and the disc for permitting the circulation of air in the manner previously described. For permitting this air to circulate about the interior of the brake, the flange 60 on the brake drum member 14" is provided with openings 64 disposed inwardly of the outwardly pressed portions 62 on the disc. The flange portion 60 of the brake drum member terminates in an oppositely inclined portion 65 and between the two oppositely inclined portions and on their inner sides, a brake ring 66 is mounted which is adapted to cooperate with the brake member 19. The outer open ends of the reinforcing element 56 and the portion 55 of the disc are closed by a cap 67 which may be permanently associated with these elements because the wheel securing nuts 35 are accessible outwardly thereof.

Hence the wheel shown by Fig. 7 is similar to that shown by Fig. 3, and permits the use of thin gauge, light metal in the disc or member 14" because the latter and the wheel disc mutually support and reinforce each other and a separate, strong brake ring 66 is utilized in the member 14", thereby minimizing the unsprung wheel weight, while providing a strong, durable, and light wheel as well as strong and light brake assembly.

In all of the constructions described and illustrated, it will be noted that the median radial plane or center load plane of the rim substantially coincides with the bolt securing means for retaining the wheel on the hub flange 12, while the wedging contact between the brake drum member and wheel disc, and the radially inner ends of the spokes are disposed at axially opposed sides of the plane. This relation of parts increases the strength and rigidity of the wheel during operation.

It is apparent that a wheel of novel construction has been provided in which a disc and wire spokes are used for supporting a tire rim and that the disc is supported on the hub and brake drum in a novel manner. It is apparent that the wedging engagement between the disc and the brake drum results in the latter supporting a large part of the load on the wheel at a point in proximity to the rim and this feature increases the rigidity of the assembly. The provision of a reinforcing element interiorly of the brake covering portion of the disc permits the use of metal of relatively light gauge in manufacturing both the disc and the brake drum without sacrificing any of the strength that is necessary in a wheel of this character in either of these parts. It will be noted that although a wedging engagement is secured between the disc and the brake drum member, the wheel is positively centered on the hub and maintained in positive alignment with the brake drum member by the securing nuts 35. The rim may be mounted on the outer periphery of the disc by riveting for example, or it may be welded thereon or in some instances it may merely be supported on the periphery of the disc but in any event the rim is rigidly supported by the outer periphery of the disc. It also will be apparent that by using thin and relatively light material in manufacturing the discs, the hub covering portion 28 may readily be formed, and the metal in general more easily worked as found necessary. The wheel not only has a pleasing appearance but is of such construction that strength and rigidity are indicated to the observer.

Although only certain forms of the invention have been illustrated and described it will be apparent to those skilled in the art that various modifications may be made without departing from the scope of the appended claims.

I claim:

1. A vehicle wheel comprising a hub having an outwardly directed, substantially radial flange, a disc secured to said flange and having an inboard directed brake flange at its radially outer edge, a thin rim supporting disc extending radially outwardly and then axially over the brake supporting flange of the first disc, said axially extending portion of the rim supporting disc and brake flange having axially inclined, wedgingly engaged surfaces, a hub shell integral with and extending axially outwardly from the inner edge of the rim supporting disc, a reinforcement member annularly supporting the inner periphery of the shell, means securing the rim supporting disc, shell and reinforcement member to the hub flange, a rim mounted on the outer portion of the rim supporting disc, and spokes connecting the rim, the shell and the reinforcement member therewithin whereby the rim supporting disc may be manufactured from light, thin gauge metal and is reinforced by the brake disc and the reinforcement member.

2. A vehicle wheel comprising a hub having a radially outwardly directed flange, a brake disc secured to the flange and having at its outer periphery an axially tapered flange, an annular hub covering member secured to the hub flange, a shell surrounding the hub covering member and being rigidly mounted on the outer surface thereof, a light, thin gauge rim supporting disc integral with the shell and having an inboard directed portion extending over the flange on the first disc, said portion and flange having tapered surfaces for wedging engagement, a rim on the second disc, and spokes connecting the hub covering member and rim.

3. A vehicle wheel comprising a hub, a brake drum member mounted on the hub and comprising a substantially radial portion having a flanged portion at its radially outer edge, and a disc mounted on the hub and engaging an outer portion of the brake member, portions of the brake member in the plane of engagement thereof with the disc, being provided with openings communicating with the interior of the brake member, and said last portions being separated from the disc at circumferentially spaced points to permit air to pass between the disc and brake drum member.

4. A wheel comprising a disc having an axially extending hub covering portion, a reinforcing shell extending axially within the hub covering portion of the disc, spokes extending through the hub covering portion of the disc and secured to the outer end of the shell, means positively connecting the shell to the disc, an inwardly extending flange on the inner end of the shell for securing the wheel to the hub, and a rim mounted on the spokes and the outer edge of the disc.

ROSCOE C. HOFFMAN.